(12) United States Patent
Kikuchi et al.

(10) Patent No.: US 8,560,667 B2
(45) Date of Patent: Oct. 15, 2013

(54) ANALYSIS METHOD AND APPARATUS

(75) Inventors: Shinji Kikuchi, Kawasaki (JP); Ken Yokoyama, Kawasaki (JP); Akira Takeyama, Kawasaki (JP); Kenichi Shimazaki, Kawasaki (JP); Takamitsu Maeda, Kawasaki (JP); Koji Ishibashi, Kawasaki (JP); Seiya Shindo, Kawasaki (JP); Koutarou Tsuro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1389 days.

(21) Appl. No.: 11/739,946

(22) Filed: Apr. 25, 2007

(65) Prior Publication Data
US 2007/0214261 A1 Sep. 13, 2007

Related U.S. Application Data

(63) Continuation of application No. PCT/JP2004/016051, filed on Oct. 28, 2004.

(51) Int. Cl.
*G06F 15/173* (2006.01)

(52) U.S. Cl.
USPC .................... 709/224; 709/217; 709/219

(58) Field of Classification Search
None
See application file for complete search history.

(56) References Cited

U.S. PATENT DOCUMENTS

| | | | |
|---|---|---|---|
| 6,230,183 B1 | 5/2001 | Yocom et al. | |
| 6,243,105 B1 * | 6/2001 | Hoyer et al. | 345/440 |
| 6,557,035 B1 * | 4/2003 | McKnight | 709/224 |
| 6,792,393 B1 * | 9/2004 | Farel et al. | 702/186 |
| 6,986,139 B1 | 1/2006 | Kubo | |
| 2001/0029545 A1 | 10/2001 | Takahashi et al. | |
| 2002/0082807 A1 | 6/2002 | Turicchi, Jr. et al. | |
| 2003/0204758 A1 * | 10/2003 | Singh | 713/320 |
| 2003/0236878 A1 | 12/2003 | Egi | |

FOREIGN PATENT DOCUMENTS

| | | |
|---|---|---|
| JP | 52-55350 | 5/1977 |
| JP | 58-51362 | 3/1983 |
| JP | 62-37763 | 2/1987 |
| JP | 5-324358 | 12/1993 |
| JP | 5-334102 | 12/1993 |

(Continued)

OTHER PUBLICATIONS

International Search Report of the International Published Application PCT/JP2004/016051 (mailed Feb. 1, 2005).

(Continued)

*Primary Examiner* — Thomas Dailey
*Assistant Examiner* — Nam Tran
(74) *Attorney, Agent, or Firm* — Staas & Halsey LLP

(57) ABSTRACT

An analysis method for carrying out an analysis for responses of a computer system including a plurality of servers, includes: obtaining data concerning a CPU utilization ratio of each of the plurality of servers from the computer system, and storing the data concerning the CPU utilization ratio into a CPU utilization ratio storage; obtaining processing history data generated in the computer system, generating data of a request frequency by users of the computer system, and storing the processing history data into a request frequency data storage; and estimating an average delay time in each server by using the CPU utilization ratio of each server, which is stored in the CPU utilization ratio storage, and the request frequency stored in the request frequency data storage, and storing the estimated average delay time into a server delay time storage. By carrying out such a processing, the analysis can be carried out without changing the computer system to be analyzed and any additional cost.

14 Claims, 15 Drawing Sheets

(56) References Cited

FOREIGN PATENT DOCUMENTS

| | | |
|---|---|---|
| JP | 6-95931 | 4/1994 |
| JP | 9-305417 | 11/1997 |
| JP | 2000-172537 | 6/2000 |
| JP | 2000-298593 | 10/2000 |
| JP | 2001-109638 | 4/2001 |
| JP | 2002-99448 | 4/2002 |
| JP | 2002-132543 | 5/2002 |
| JP | 2002-268922 | 9/2002 |
| JP | 2002-342182 | 11/2002 |
| JP | 2003-32306 | 1/2003 |
| JP | 2003-178040 | 6/2003 |
| JP | 2003-263342 | 9/2003 |
| JP | 2004-5135 | 1/2004 |
| JP | 2004-46734 | 2/2004 |
| JP | 2004-193816 | 7/2004 |
| JP | 2004-272582 | 9/2004 |
| WO | 94/09429 | 4/1994 |

OTHER PUBLICATIONS

Office Action issued in corresponding Japanese Patent Application No. 2006-542174; mailed on May 13, 2008.

* cited by examiner

| TIME RANGE | UNIT TIME NO. $i$ | Req/sec $\lambda^i$ | DELAY ACTUAL MEASUREMENT VALUE $A^i$ | CPU UTILIZATION RATIO | | | |
|---|---|---|---|---|---|---|---|
| | | | | $\rho^i_{(1,1)}$ | $\rho^i_{(1,2)}$ | $\rho^i_{(2,1)}$ | $\rho^i_{(3,1)}$ |
| 9:00~10:00 | 1 | 5.5 | 3.5 | 30% | 40% | 60% | 20% |
| 10:00~11:00 | 2 | 3.3 | 2.2 | 15% | 22% | 10% | 15% |
| 11:00~12:00 | 3 | 4.2 | 2.8 | 20% | 20% | 30% | 10% |
| 12:00~13:00 | 4 | 0.8 | 1.5 | 5% | 10% | 5% | 5% |
| 13:00~14:00 | 5 | 2.4 | 2.4 | 15% | 15% | 20% | 10% |
| ⋮ | ⋮ | ⋮ | | ⋮ | ⋮ | ⋮ | ⋮ |
FIG.6
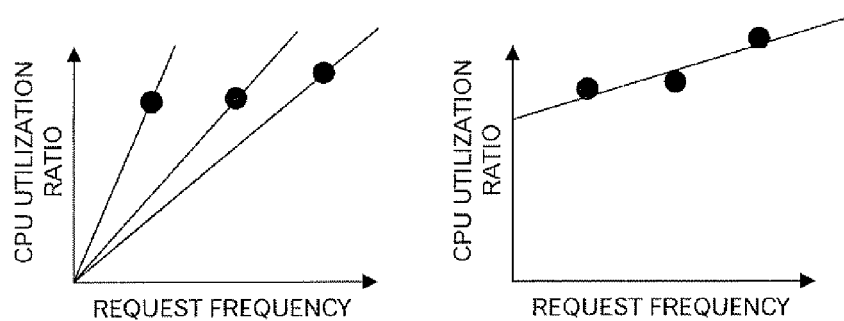
FIG.7A  FIG.7B
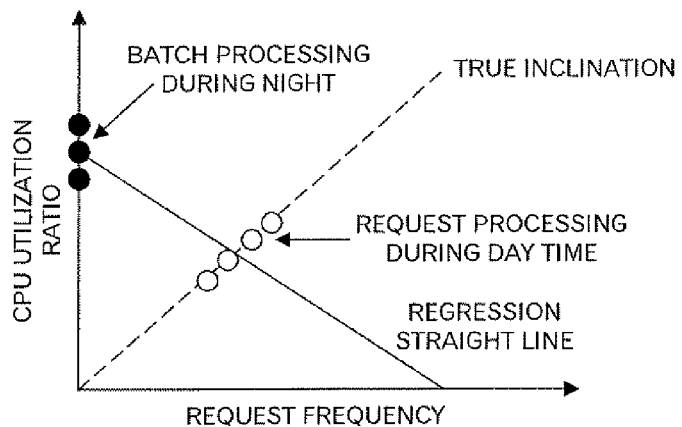
FIG.8

FIG.11A

[1] ESTIMATED RESULT AND ACTUAL MEASUREMENT RESULT OF DELAY TIME

| FIRST LAYER (WEB SERVER) | 150 msec CORRELATION COEFFICIENT 0.9 CONFIDENCE DEGREE 0 |
| SECOND LAYER (APPLICATION SERVER) | 60 msec CORRELATION COEFFICIENT 0.85 CONFIDENCE DEGREE 0.6 |
| THIRD LAYER (DB SERVER) | 30 msec CORRELATION COEFFICIENT 0.6 CONFIDENCE DEGREE 0.6 |
| AVERAGE DELAY ACTUAL MEASUREMENT VALUE | 100 msec |

FIG.11B

[2] SORTING RESULT

FIRST LAYER (WEB SERVER)
THIRD LAYER (DB SERVER)
SECOND LAYER (APPLICATION SERVER)
AVERAGE DELAY ACTUAL MEASUREMENT VALUE

FIG.11C

[3] ESTIMATED RESULT AFTER CORRECTION

| FIRST LAYER (WEB SERVER) | 10 msec CORRELATION COEFFICIENT 0.9 CONFIDENCE DEGREE 0.06 |
| SECOND LAYER (APPLICATION SERVER) | 60 msec CORRELATION COEFFICIENT 0.85 CONFIDENCE DEGREE 0.6 |
| THIRD LAYER (DB SERVER) | 30 msec CORRELATION COEFFICIENT 0.6 CONFIDENCE DEGREE 0.6 |
| AVERAGE DELAY ACTUAL MEASUREMENT VALUE | 100 msec |

| CONSUMED CPU TIME PER 1 REQUEST | | | CPU UTILIZATION RATIO | | | AVERAGE DELAY TIME FOR EACH SERVER | | | AVERAGE DELAY TIME FOR EACH LAYER | | | DELAY ACTUAL MEASUREMENT VALUE | ESTIMATED DELAY TIME OTHER THAN SERVERS | CONFIDENCE DEGREE OF DELAY TIME OF EACH LAYER | | |
|---|---|---|---|---|---|---|---|---|---|---|---|---|---|---|---|---|
| | | | | | | | | | 1 | 2 | 3 | | | 1 | 2 | 3 |
| 1 | $S_{(1,1)}$ | $S_{(1,2)}$ | $S_{(1,1)}$ | $S_{(1,2)}$ | $S_{(1,1)}$ | $S_{(1,2)}$ | $S_{(1,1)}$ | | | | | | | | | |
| 2 | $S_{(2,1)}$ | | $S_{(2,1)}$ | | $S_{(2,1)}$ | | | | | | | | | | | |
| 3 | $S_{(3,1)}$ | | $S_{(3,1)}$ | | $S_{(3,1)}$ | | | | | | | | | | | |
| ... | ... | ... | ... | ... | ... | ... | ... | ... | ... | ... | ... | ... | ... | ... | ... | ... |

FIG.15

ANALYSIS METHOD AND APPARATUS

CROSS-REFERENCE TO RELATED APPLICATIONS

This application is a continuing application, filed under 35 U.S.C. section 111(a), of International Application PCT/JP2004/016051, filed Oct. 28, 2004.

TECHNICAL FIELD OF THE INVENTION

This invention relates to an analysis technique for responses in a computer system.

BACKGROUND OF THE INVENTION

Along with development of a network service, a system to provide the service becomes complicated and large-scale. A lot of services have come to be provided by combining many servers. In such a system, it becomes very difficult to grasp how the utilization state of the resources of each server influences the response to the user.

Conventionally, following two methods are known in order to investigate what ratio the delay in each server of a system having plural servers occupies for a response time the user feels. Namely, (1) a special identification tag is attached to messages transmitted and received between servers, and the delay is measured by using the tag. (2) Messages transmitted and received between servers are captured by the packet capture to analyze such information.

However, the method (1) has to change the existing system and the service, and the introduction of this function is not easy. In addition, the method (2) requires an expensive equipment and a storage having a large capacity for the packet capture. Furthermore, in view of the security, the packet capture is not preferable.

In addition, US-2003/0236878-A1 discloses a technique to effectively evaluate, by the limited number of experiment times, the response capability of each application under various utilization states for one or plural applications operating on an information system. More specifically, when the load injection experiment corresponding to various utilization states of the application is carried out plural times, the quantity concerning the utilization state of the application, the quantity concerning the response capability of the application, the quantity concerning the utilization state of the hardware resource and the quantity of the response capability of the hardware resource are obtained, and by creating estimate equations describing the dependence relation between the quantities, the evaluation of the response capability of the application, by using the estimate equations, is enabled. However, this technique needs the "experiment", and the analysis cannot be carried out while carrying out a regular processing.

SUMMARY OF THE INVENTION

Therefore, an object of this invention is to provide a technique for carrying out an analysis concerning the response of a computer system by using information that can be easily obtained from the computer system to be analyzed (hereinafter, to be monitored).

An analysis method according to this invention is an analysis method for carrying out an analysis for responses of a computer system including a plurality of servers. The analysis method includes: obtaining data concerning a CPU utilization ratio of each of the plurality of servers from the computer system, and storing the data concerning the CPU utilization ratio into a CPU utilization ratio storage; obtaining processing history data generated in the computer system, generating data of a request frequency by users of the computer system, and storing the data of the request frequency into a request frequency data storage; and estimating an average delay time in each server by using the CPU utilization ratio of each server, which is stored in the CPU utilization ratio storage, and the request frequency stored in the request frequency data storage, and storing the estimated average delay time into a server delay time storage.

Thus, because the processing is carried out by using data that can be easily obtained such as the CPU utilization ratio and the processing history data, the analysis processing can be carried out while reducing the introduction cost, and without causing any problem on the security.

Furthermore, the aforementioned estimating may include: estimating an average consumed CPU time per one request for each server by using the CPU utilization ratio of each server, which is stored in the CPU utilization ratio storage and the request frequency stored in the request frequency data storage, and storing the average consumed CPU time into a consumed CPU time storage; and estimating an average delay time in each server by using the average consumed CPU time per one request for each server, which is stored in the consumed CPU time storage, and the CPU utilization ratio of each server, which is stored in the CPU utilization ratio storage, and storing the average delay time in each server into a server delay time storage.

In addition, in the aforementioned estimating the average consumed CPU time, the average consumed CPU time per one request for each server may be estimated by carrying out a regression analysis by using the CPU utilization ratio of each server in a predesignated time range and the request frequency. Thus, by limiting to the predesignated time range, it is possible to exclude the time range when the request by the user is not processed so much and to improve the calculation accuracy.

Furthermore, in the aforementioned estimating the average delay time, a pertinent coefficient value representing a relation between the average consumed CPU time per one request for the server and the average delay time in the server may be read out by referring to a matrix storage storing said coefficient values for each predetermined unit of the CPU utilization ratio, which is an element to determine the coefficient value and for each number of CPUs, and the average delay time in the server may be calculated from the coefficient value and the average consumed CPU time per one request for the server. Because the coefficient value is a function of the CPU utilization ratio and the number of CPUs, the coefficient value can be calculated each time. However, because the calculation amount is actually increased, the coefficient values may be stored in the aforementioned matrix storage in order to enhance the processing speed.

In addition, this invention may further include, when the plurality of servers included in the computer system are categorized according to job types to be executed, estimating the average delay time for each category. For example, in a computer in which layers are defined, the average delay time may be calculated for each layer as the category. For example, it is to extract a problem for each job.

Furthermore, this invention may further include estimating an average delay time for the entire computer system by using the data stored in the server delay time storage, and storing the average delay time for the entire computer system into a system delay time storage.

In addition, this invention may further include: obtaining an average actual measurement value of a response time for a request by a user, and storing the average actual measurement value into an average actual measurement value storage; and estimating a delay time, which occurs in a portion other than the servers, by a difference between the average actual measurement value stored in the average actual measurement value storage and the average delay time of the entire computer system, which is stored in the system delay time storage. When the delay time, which occurs in the portion other than the server is shorter than the average delay time of the entire computer system, the estimation is improper because of any reasons, and it also becomes possible to detect such a case.

Furthermore, this invention may further include: calculating, for each category, a correlation coefficient between a total sum of the average consumed CPU times and the request frequency, determining a confidence degree of the average delay time for each category based on the correlation coefficient, and storing the confidence degree into a confidence degree data storage; and correcting the average delay time for each category based on the confidence degree of the average delay time for each category, which is stored in the confidence degree data storage, and storing the corrected average delay time into a storage device. For example, as for the average delay time whose confidence degree is high, the average delay time is used as it is, and as for the average delay time whose confidence degree is low, the average delay time is largely corrected.

Furthermore, the aforementioned correcting may include: sorting the average delay times in descending order of the confidence degree; accumulating the average delay times for each category in the descending order of the confidence degree, and identifying an order of the confidence degree at which the accumulated average delay time becomes the maximum value less than the delay actual measurement value; and correcting the delay time in a next order of the identified order of the confidence degree to a difference between the delay actual measurement value and a value obtained by accumulating the average delay times for each category in the descending order of the confidence degree up to the identified order of the confidence degree.

In addition, this invention may further include: when the request frequency is experimentally changed, for example, changing the CPU utilization ratio of each server according to the changed request frequency, and storing the changed CPU utilization ratio into the storage device; estimating the average delay time for each server by using the changed CPU utilization ratio for each server, which is stored in the storage device, and storing the estimated average delay time into the storage device; and outputting the average delay time for each server before and after the change, which are stored in the server delay time storage and the storage device, in a comparable manner. It is possible to know how the delay time is changed for the change of the request frequency.

In addition, this invention may further include: when the number of CPUs is experimentally changed, for example, changing the CPU utilization ratio of each server according to the changed number of CPUs, and storing the changed CPU utilization ratio into the storage device; estimating the average delay time in each server by using the changed CPU utilization ratio of each server, which is stored in the storage device, and the changed number of CPUs, and storing the estimated average delay time into the storage device; and outputting the average delay times of each server after and before the change, which are stored in the server delay time storage and the storage device, in a comparable manner. When increasing the number of CPUs, for example, it is possible to try how much the delay time is decreased, and the reasonability of the investment can be judged from the effect.

This invention may further include: when the number of servers is changed, calculating an average consumed CPU time per one request for each server according to the changed number of servers, and storing the calculated average consumed CPU time into the storage device; calculating a CPU utilization ratio for each server after the change by using the number of CPUs and the average consumed CPU time per one request for each server after the change, which is stored in the storage device, and storing the calculated CPU utilization ratio into the storage device; and estimating an average delay time for each server after the change by using the average consumed CPU time per one request for each server after the change, which is stored in the storage device, and the CPU utilization ratio for each server after the change, and storing the estimated average delay time into the storage device. When the number of servers is increased, for example, it is possible to try how much the delay time is decreased, and the reasonability of the investment can be judged from the effect.

Furthermore, this invention may further include estimating an average delay time for each category defined by classifying the plurality of servers in the computer system according to a job type to be executed by using the average delay time for each server after the change, which is stored in the storage device, and the changed number of servers, and storing the estimated average delay time into the storage device.

Incidentally, it is possible to create a program for causing a computer to execute the aforementioned analysis method. The program is stored into a storage medium or a storage device such as a flexible disk, a CD-ROM, a magneto-optical disk, a semiconductor memory, or a hard disk. In addition, the program may be distributed as digital signals over a network in some cases. Incidentally, data under processing is temporarily stored in the storage device such as a computer memory.

BRIEF DESCRIPTION OF THE DRAWINGS

FIG. 6 is a diagram showing an example of obtained data;
FIGS. 7A and 7B are diagrams to explain regression calculation;
FIG. 8 is a diagram to explain the reason to limit objects of the regression calculation to the business time;
FIGS. 11A to 11C are diagrams to explain a specific example of the correction processing of the delay time according to the confidence degree.

FIG. 15 is a diagram showing an example of a processing result tabulation;

DETAILED DESCRIPTION OF THE PREFERRED EMBODIMENTS

Figure 1:
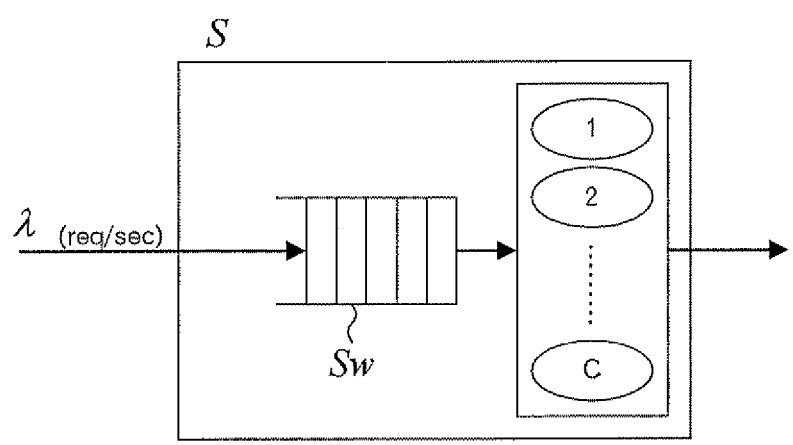
FIG. 1 is a diagram showing the principle of this invention.

[Principle of this Invention]
A. Derivation of a Theoretical Value X^ (a Symbol That ^ is Attached on the Top of X is Also Indicated as "X'") of an Average Delay Time in a Web System Model
A-1. Modeling of the Delay Time of a Single Server First, by using FIG. 1, it is considered that the average delay time in the single server S having plural CPUs is derived. The server S shown in FIG. 1 has C CPUs from CPU_1 to CPU_C, and requests input from the outside at the request frequency λ (req/sec) are input into a queue Sw and then processed by C CPUs. At this time, the utilization ratio of the CPU is represented as ρ(%). Then, from an analysis result of the M/M/s queue mode, an average stay time T (C, λ, ρ) is as follows:

$$T(C, \lambda, \rho) = F(C, \lambda, \rho) G(C, \rho) \quad (1)$$

$$F(C, \lambda, \rho) = \frac{C\rho}{\lambda} \quad (2)$$

$$G(C, \rho) = \left( C \left( \frac{1-\rho}{C^C \rho^C} C! \sum_{r=0}^{C-1} \frac{C^r \rho^r}{i!} + 1 \right) (1-\rho) \right)^{-1} + 1 \quad (3)$$

From the expressions (1) to (3), the average stay time T(C, λ, ρ) in the server S satisfies the following relation. Incidentally, α represents a ratio of requests that reach the server S.

$$T(C, \alpha\lambda, \rho) = \frac{1}{\alpha} T(C, \lambda, \rho) \quad (4)$$

A-2. Modeling of the Delay Time in the N-th Server Layer

Figure 2:
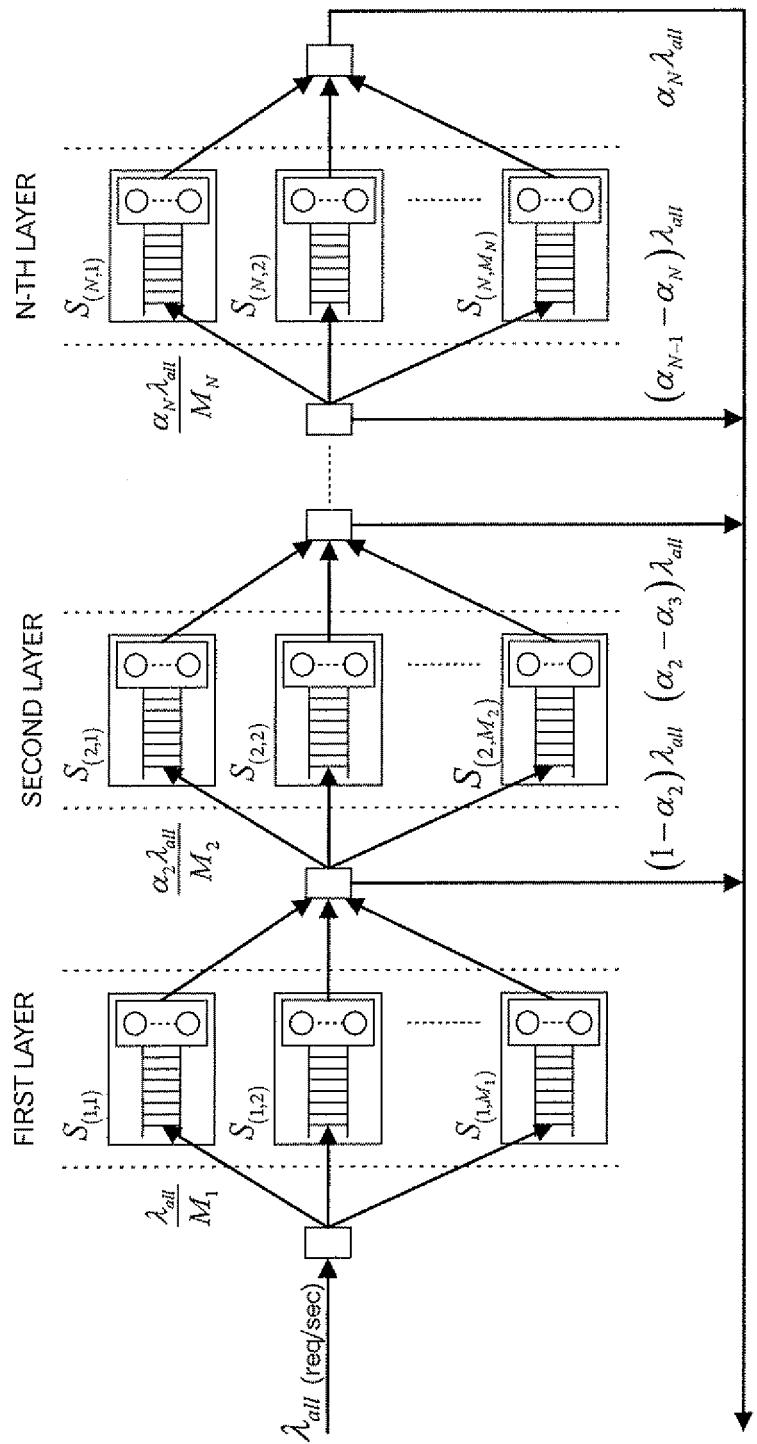
FIG. 2 is a diagram showing the principle of this invention.

Here, by using a delay model in the single server, an average delay time of the requests in a specific single layer of plural layers is calculated. FIG. 2 shows a system model as an assumption. In the first layer, $M_1$ servers $S_{(1,1)}$, $S_{(1,2)}$, ... $S_{(1,M1)}$ exist, in the second layer, $M_2$ servers $S_{(2,1)}$, $S_{(2,2)}$, ... $S_{(2,M2)}$ exist, and further in the n-th layer, $M_N$ servers $S_{(N,1)}$, $S_{(N,2)}$, ... $s_{(n, MN)}$ exist. In addition, $\alpha_n$ represents a ratio of requests that reach the n-th layer, and when the requests are evenly assigned to servers in each layer, and the requests are input at the request frequency $\lambda_{all}$ (req/sec) to this system, $\lambda_{all}/M_1$ requests are input into each server in the first layer, the requests leaving from the first layer is $(1-\alpha_2)\lambda_{all}$, $\alpha_2\lambda_{all}/M_2$ requests are input to each server of the second layer, the requests leaving from the second layer is $(\alpha_2-\alpha_3) \lambda_{all}$, the request leaving from the (N−1)-th layer is $(\alpha_{N-1}-\alpha_N) \lambda_{11}$, $\alpha_N\lambda_{all}/M_N$ requests are input to each server of the N-th layer, and the requests output from the N-th layer are $\alpha_N\lambda_{all}$. Incidentally, 1≤n≤N, and 1≤m≤$M_n$.

Different roles such as a Web server used as a front end for the user, an application server for dynamically processing the requests and the like are respectively assigned to each layer.

Then, when the request frequency to the n-th layer server $S_{(n,m)}$ is $\lambda_{(n,m)}$, the average delay time in the server $S_{(n,m)}$ can be represented by $T(C_{(n,m)}, \lambda_{(n,m)}, \rho_{(n,m)})$. In addition, when the total sum of the requests input into the n-th layer is $\alpha_n\lambda_{all}$, and those are evenly assigned to $M_n$ servers, the following expressions are satisfied.

$$\lambda_{(n,m)} = \frac{\alpha_n}{M_n} \lambda_{all}$$

Because the requests are evenly assigned to each server, the average delay time $W_n$ of all the requests in the n-th layer is an average of the average delay times of all the servers existing in the n-th layer.

$$W_n = \frac{1}{M_n} \sum_{i=1}^{M_n} T(C_{(n,i)}, \lambda_{(n,i)}, \rho_{(n,i)}) \quad (5)$$

Here, $W_n$ is represented by using the expressions (1) to (4) as follows:

$$W_n = \frac{1}{M_n} \sum_{i=1}^{M_n} T(C_{(n,i)}, \lambda_{(n,i)}, \rho_{(n,i)}) \quad (6)$$

$$= \frac{1}{M_n} \sum_{i=1}^{M_n} T\left(C_{(n,i)}, \frac{\alpha_n}{M_n} \lambda_{all}, \rho_{(n,i)}\right)$$

$$= \frac{1}{\alpha_n} \sum_{i=1}^{M_n} T(C_{(n,i)}, \lambda_{all}, \rho_{(n,i)})$$

Here, in order to simplify the notation, $H_n$ is defined as follows:

$$H_n = \sum_{i=1}^{M_n} T(C_{(n,i)}, \lambda_{all}, \rho_{(n,i)}) \quad (7)$$

A-3. Modeling of the Delay Time in the Entire System

Here, by using the delay model in each layer, the modeling of the delay time in the entire system is carried out. After the servers from the first layer to the n-th layer are used, the number $R_n$ of requests leaving from the system among all the requests is as follows:

$$R_n = (\alpha_n - \alpha_{n+1})\lambda_{all}(\alpha_1 = 1, \alpha_{N+1} = 0) \quad (8)$$

In addition, after the servers from the first layer to the n-th layer are used, the average delay $L_n$ of the requests leaving from the system is as follows:

$$L_n = \sum_{i=1}^{n} W_i \quad (9)$$

In addition, the following relation is satisfied from the definition.

$$L_n - L_{n-1} = W_n \quad (10)$$

Because the average delay time X^ per one request is represented by the product of the delay for requests leaving from the system after the servers from the first layer to the i-th layer are used and a ratio of the requests for all the requests, the average delay time $\hat{X}$ is represented as follows:

$$\begin{aligned}
\hat{X} &= \frac{1}{\lambda_{all}} \sum_{i=1}^{N} R_i L_i \\
&= \sum_{i=1}^{N} (\alpha_i - \alpha_{i+1}) L_i \\
&= (\alpha_1 - \alpha_2) L_1 + (\alpha_2 - \alpha_3) L_2 + \ldots + (\alpha_N - \alpha_{N+1}) L_N \\
&= \alpha_1 L_1 + \alpha_2 (L_2 - L_1) + \ldots + \alpha_N (L_N - L_{N-1}) - \alpha_{N+1} L_N \\
&= \alpha_1 W_1 + \alpha_2 W_2 + \ldots + \alpha_N W_N \\
&= \sum_{n=1}^{N} H_n
\end{aligned} \tag{11}$$

As the aforementioned results, when considering the average delay time of all the requests, H, represents the delay, which occurs in each layer, and it can be said that its total sum $\hat{X}$ represents the average delay time in the entire system for all the requests.

[Specific Processing]

Figure 3:
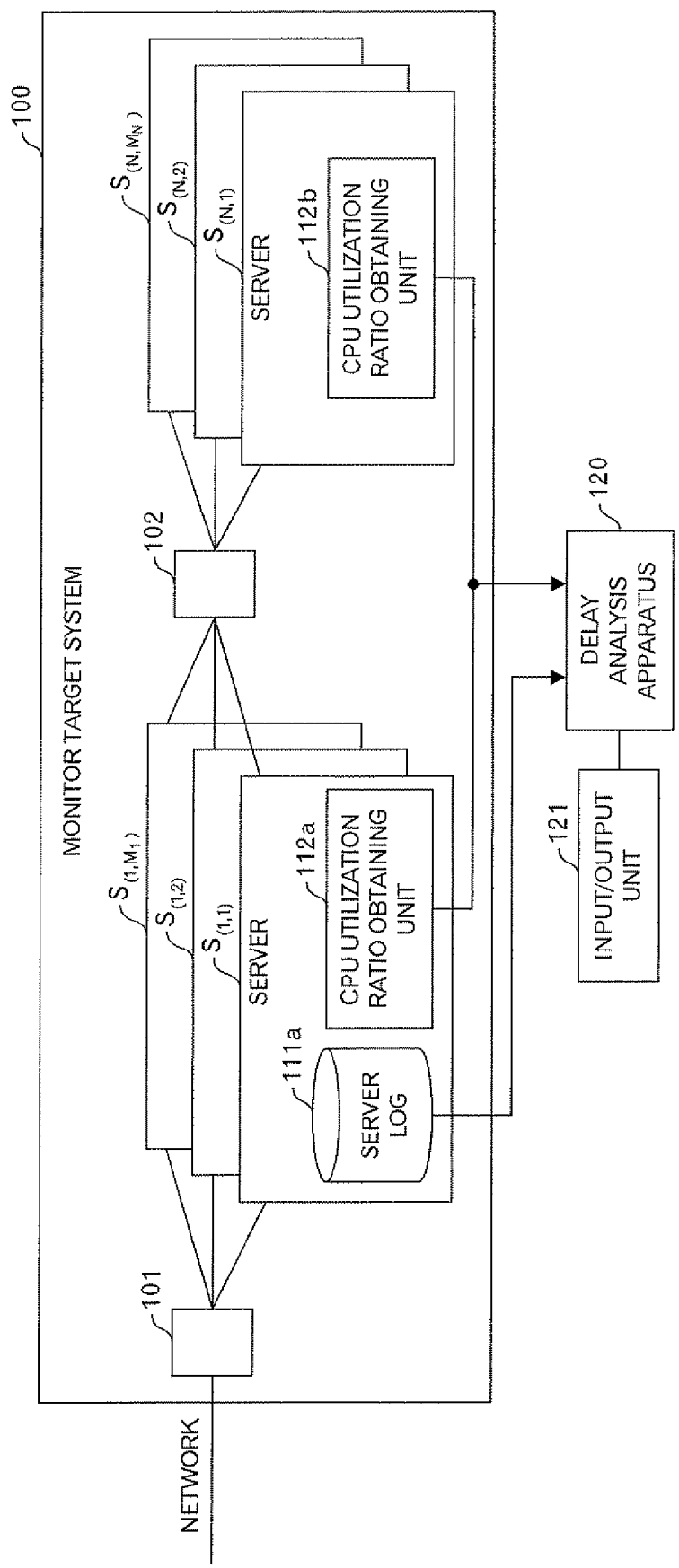
FIG. 3 is a diagram to explain the entire system in an embodiment of this invention.

FIG. 3 shows an outline of a system including a monitor target system 100 and a delay analysis apparatus 120. The monitor target system 100 is connected with a network, and has an n-layer configuration (in FIG. 3, two layers to simplify the explanation) as shown in FIG. 2. In each layer, load distribution apparatuses 101 and 102 are provided, and the load distribution apparatuses almost evenly assign the requests to servers $S_{(1,1)}$, $S_{(1,2)}$ and $S_{(1,M1)}$ and servers $S_{(N,2)}$ and $S_{(N,MN)}$ in each layer. For the servers of the first layers, a server log 111a is provided, the log data generated when the processing for the request is carried out is stored. In addition, in each server, Central Processing Unit (CPU) utilization ratio obtaining units 112a and 112b are provided, and in this embodiment, the CPU utilization ratio is obtained by % unit. These CPU utilization ratio obtaining units 112a and 112b are general tools executed by a command such as sar, mpstat and iostat in UNIX (Registered Trade Mark) Operating System (OS) and the like, and a lot of recent OS have the similar function.

The delay analysis apparatus 120 is connected with the monitor target system 100, and carries out a processing by using the log data stored in the server log 111a and the CPU utilization ratio. Thus, different from the conventional arts, because there is no need to install any special mechanism into the monitor target system 100, the introduction of the delay analysis apparatus 120 is easy, and furthermore, because all the packets processed in the monitor target system 100 do not have to be analyzed, there is no need to use a storage having a large capacity, and the problem on the security does not occurs easily. The delay analysis apparatus 120 is connected to an input/output unit 121 such as a display device, mouse, keyboard and the like.

Figure 4A:
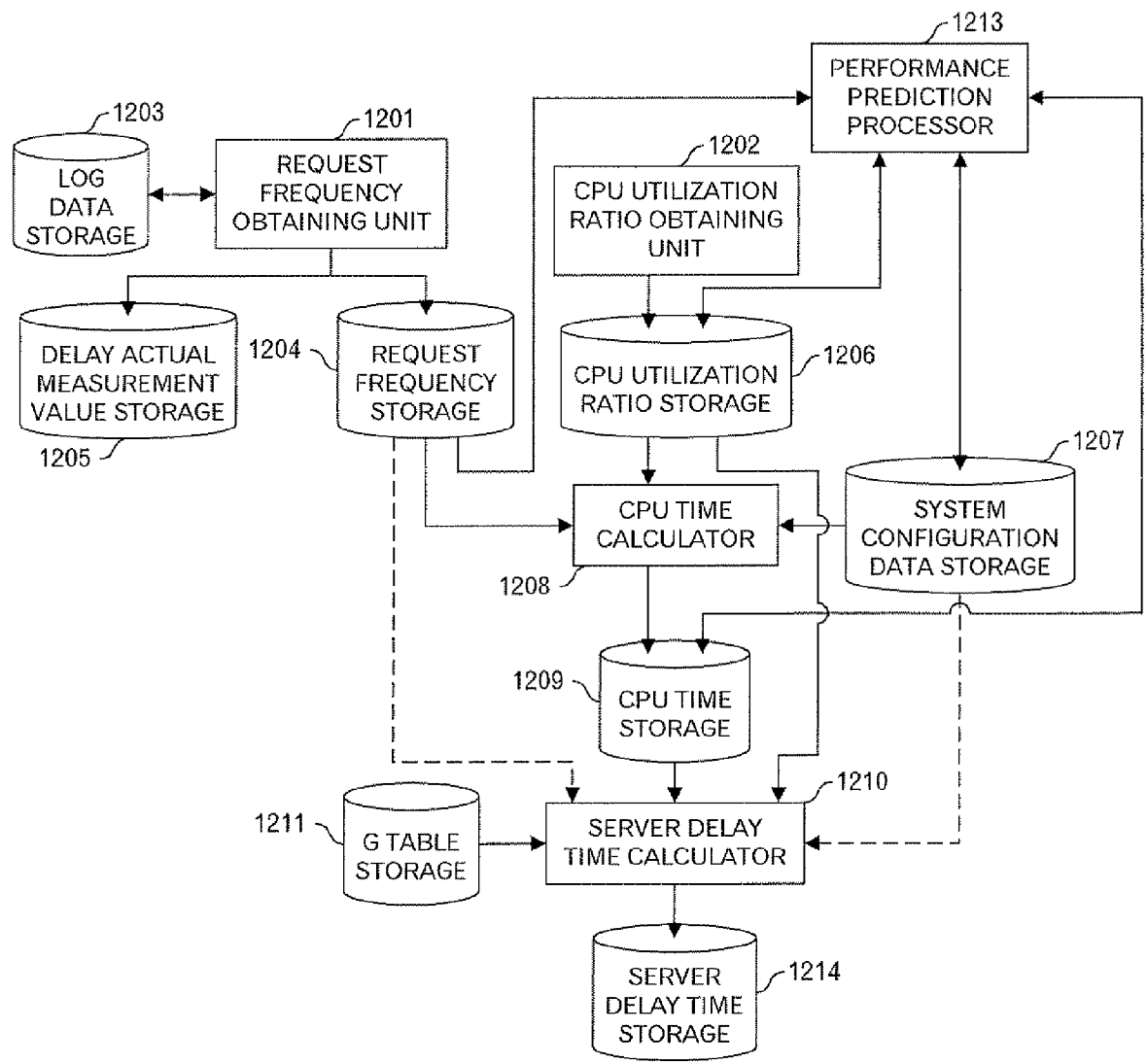
FIG. 4A is a functional block diagram of a delay time analysis apparatus in the embodiment of this invention.
Figure 4B:
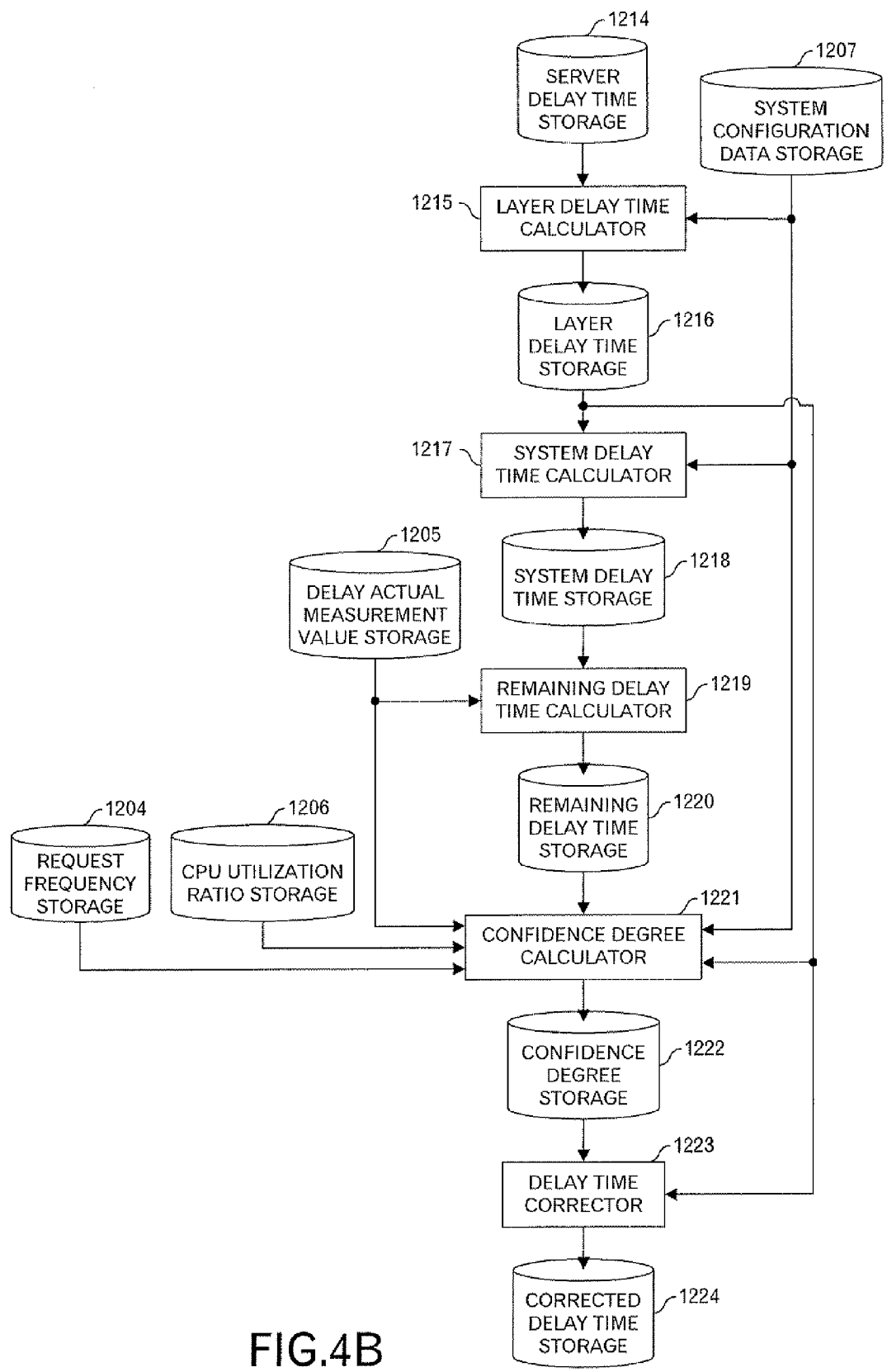
FIG. 4B is a functional block diagram of the delay time analysis apparatus in the embodiment of this invention.

FIGS. 4A and 4B show functional block diagrams of the delay analysis apparatus 120. The delay analysis apparatus 120 has a request frequency obtaining unit 1201, a CPU utilization ratio obtaining unit 1202, a log data storage 1203, a request frequency storage 1204, a delay actual measurement value storage 1205, a CPU utilization ratio storage 1206, a system configuration data storage 1207, a CPU time calculator 1208, a CPU time storage 1209, a performance prediction processor 1213, a server delay time calculator 1210, a G table storage 1211, a server delay time storage 1214, a layer delay time calculator 1215, a layer delay time storage 1216, a system delay time calculator 1217, a system delay time storage 1218, a remaining delay time calculator 1219, a remaining delay time storage 1220, a confidence degree calculator 1221, a confidence degree storage 1222, a delay time corrector 1223, and a corrected delay time storage 1224.

The request frequency obtaining unit 1201 receives the log data from the server log 111a of the monitor target system 100, and stores the log data into the log data storage 1203, and processes the log data stored in the log data storage 1203 to calculate a request frequency (req/sec), and stores the request frequency into the request frequency storage 1204. In addition, the request frequency obtaining unit 1201 processes the log data stored in the log data storage 1203 to calculate an average delay actual measurement value, and stores the average delay actual measurement value into the delay actual measurement value storage 1205. The CPU utilization obtaining unit 1202 obtains data of a CPU utilization ratio from the CPU utilization ratio obtaining unit 112 of the monitor target system 100r and stores the data into the CPU utilization ratio storage 1206.

The CPU time calculator 1208 refers to the request frequency storage 1204, the CPU utilization ratio storage 1206 and the system configuration data storage 1207 to calculate a consumed CPU time per one request, and stores the calculated data into the CPU time storage 1209. The server delay time calculator 1210 refers to the CPU time storage 1209, the G table storage 1211 and the CPU utilization ratio storage 1206 to calculate a delay time for each server, and stores the calculated data into the server delay time storage 1214. Incidentally, the server delay time calculator 1210 may refer to the request frequency storage 1204 and the system configuration storage 1207 when the G table storage 1211 is not referenced.

Furthermore, the layer delay time calculator 1215 refers to the server delay time storage 1214 and the system configuration data storage 1207 to calculate the delay time for each layer, and stores the calculated data into the layer delay time storage 1216. The system delay time calculator 1217 refers to the layer delay time storage 1216 and the system configuration data storage 1207 to calculate the delay time of the entire system, and stores the calculated data into the system delay time storage 1218. The remaining delay time calculator 1219 refers to the delay actual measurement value storage 1205 and the system delay time storage 1218 to calculate a remaining delay time consumed by other apparatuses other than the servers, and stores the calculated data into the remaining delay time storage 1220.

In addition, the confidence degree calculator 1221 refers to the remaining delay time storage 1220, the system configuration data storage 1207, the delay actual measurement value storage 1206, the request frequency storage 1204, the CPU utilization ratio storage 1206 and the layer delay time storage 1216, and when the remaining delay time consumed by other apparatuses other than the servers is less than 0, the confidence degree calculator 1221 calculates a confidence degree for the delay time of each layer, and stores the calculated confidence degree data into the confidence degree storage 1222. The delay time corrector 1223 refers to the layer delay time storage 1216 and the confidence degree storage 1222 to correct the delay time for each layer, and stores data of the corrected delay time into the corrected delay time storage 1224.

The performance prediction processor 1213 carries out a processing by using the CPU utilization ratio storage 1206, the system configuration data storage 1207, the CPU time storage 1209 and the request frequency storage 1204.

Incidentally, the input/output unit 121 can output the data in the respective storages in the delay analysis apparatus 120 to the display device or the like.

Figure 5:
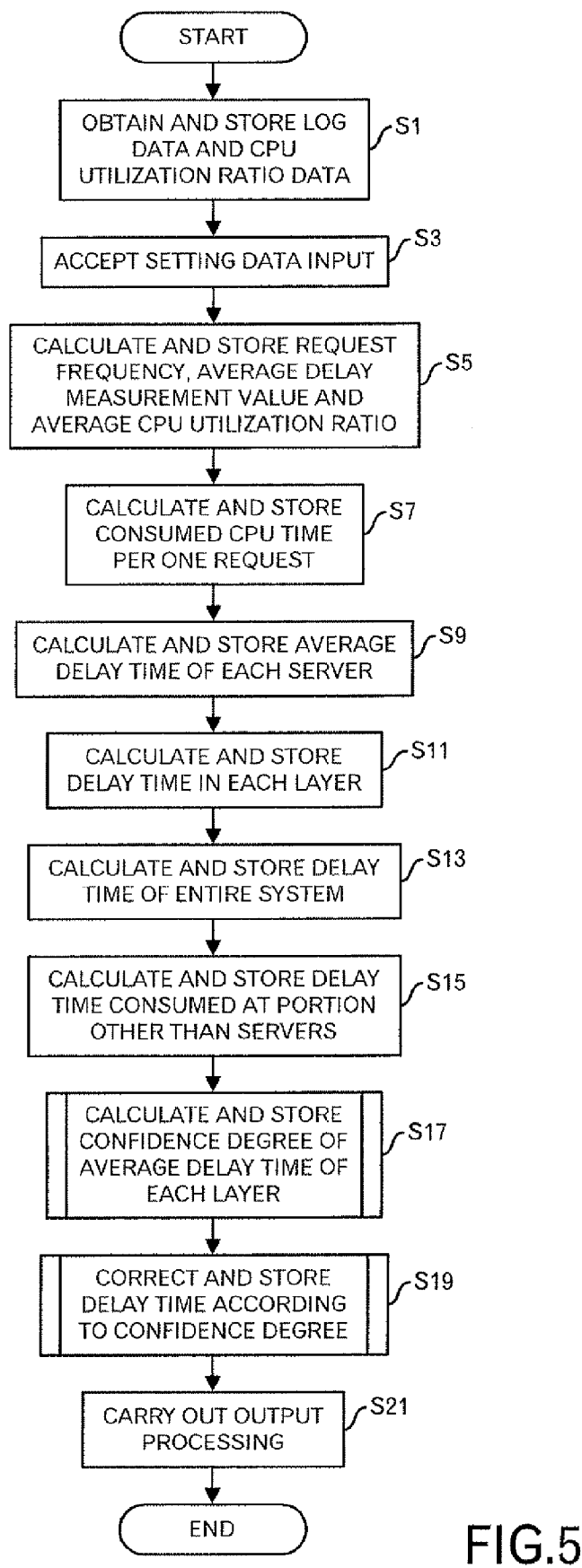
FIG. 5 is a diagram showing a main processing flow of the embodiment of this invention.
Figure 9:
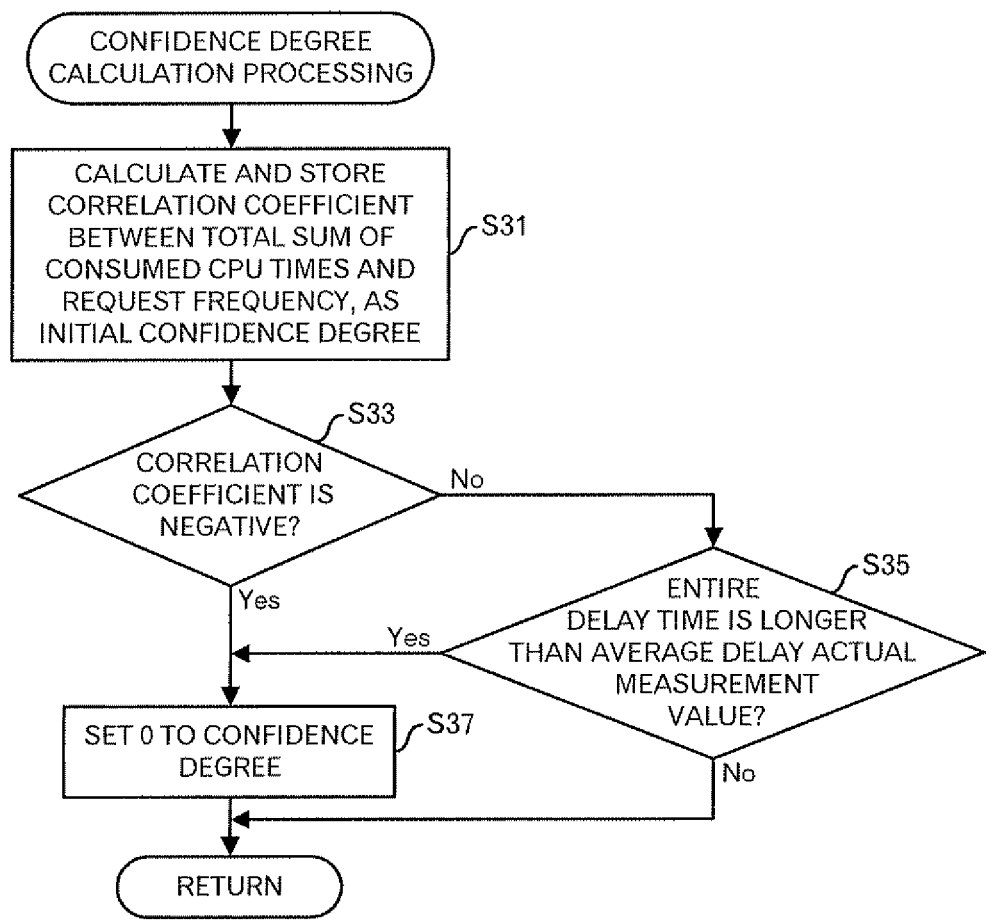
FIG. 9 is a diagram showing a processing flow of a confidence degree calculation processing.
Figure 10:
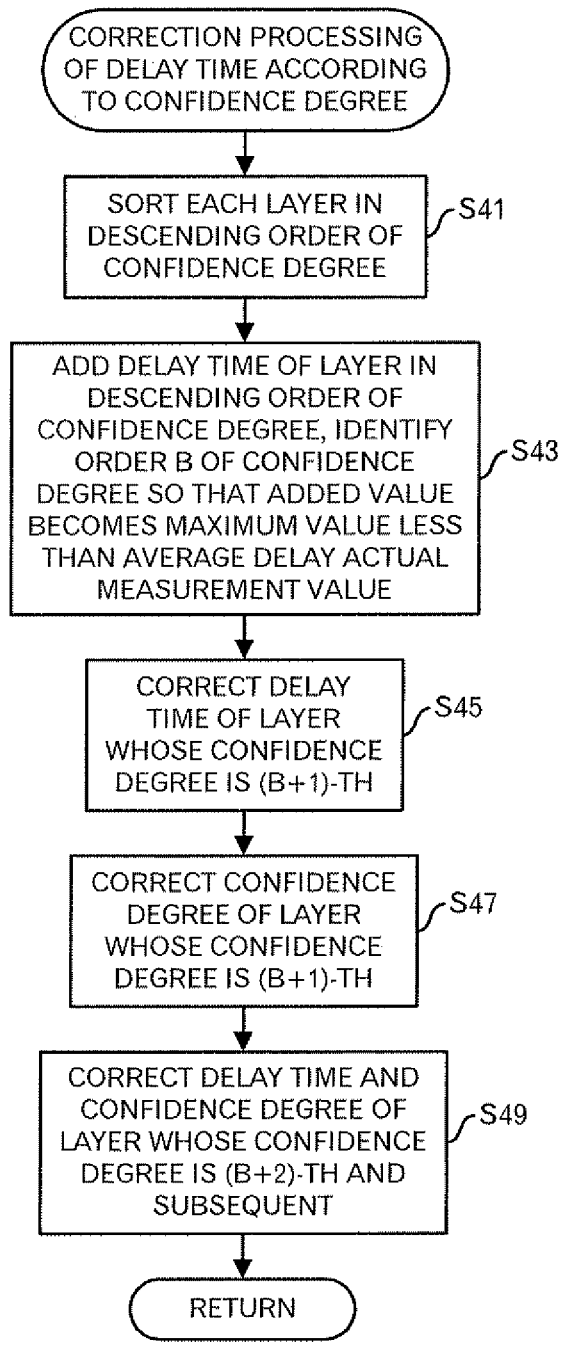
FIG. 10 is a diagram showing a processing flow of a correction processing of the delay time according to the confidence degree.

Next, the processing content of the system shown in FIGS. 3, 4A and 4B will be explained with reference to FIGS. 5 to 16. First, the request frequency obtaining unit 1201 obtains the log data from the server log 111a of the monitor target system 100, and stores the log data into the log data storage 1203, and the CPU utilization ratio obtaining unit 1202 obtains data of the CPU utilization ratio from the CPU utilization ratio obtaining unit 112 of the monitor target system 100, and stores the data of the CPU utilization ratio into the CPU utilization ratio storage 1206 (FIG. 5: step S1).

An example of the log data stored in the log data storage 1203 is shown below.

"192.168.164.108--[14/Sep/2004:12:27:50+0900] "GET/~hoge/SSSS /SSSS_20040816.pdfHTTP/1.1" 200 147067 "-" "Mozilla/4.0 (compatible; MSIE 6.0; Windows NT 5.1; .NET CLR 1.1.4322)" 0.053" (Windows is the Registered Trade Mark.)

This is an example of a log picked in a custom log format in the Apache Web server. Generally, the logs are stored as the server log 111a under a directory /var/log/httpd/ of the Web server included in the monitor target system 100 or the like. This first section "192.168.164.108" represents an IP address of an access source client. The second and third sections are omitted. The fourth section "[14/Sep/2004:12:27:50+0900]" represents an access time. The fifth section "GET/~hoge/SSSS/SSSS_20040817.pdf HTTP/1.1" represents an access content. The sixth section "200" represents the status (here, normal). The seventh section "147067" represents the number of transmitted and received bytes. The eighth section "-" represents a URL path requested. The ninth section "Mozilla/4.0 (compatible; MSIE 6.0; Windows NT 5.1; .NET CLR 1.1.4322)" represents a browser used in the access source client. The tenth section "0.053" represents a time (sec) consumed to handle the request.

Next, the input/output unit 121 accepts setting inputs of a period to be analyzed and a business time range, and stores the setting inputs into a storage device such as a main memory (step S3). The business time range means that a time range that the CPU time the server consumes for a processing other than requests from the users is few. By designating the business time range, it is possible to reduce an estimation error caused by consuming, by the server, the large CPU time when the request is few such as night.

Then, the request frequency obtaining unit 1201 reads out the log data in the designated period to be analyzed and the business time range from the log data storage 1203, and counts the requests processed for each one hour, for example, and divides the count value by 3600 seconds (=one hour) to calculate the request frequency λ per one second (req/sec), and stores the request frequency into the request frequency storage 1204. In addition, the request frequency obtaining unit 1201 adds the time consumed to handle all the requests every one hour, for example, and divides the added time by the number of requests to calculate an average delay actual measurement value, and stores the average delay actual measurement value into the delay actual measurement value storage 1205. Furthermore, the CPU utilization ratio calculator 1208 calculates an average CPU utilization ratio $\rho^i_{(n,m)}$ of each server $S_{(n,m)}$ for each one hour based on data of the CPU utilization ratio stored in the CPU utilization ratio storage 1206, and stores the average CPU utilization ratio $\rho^i_{(n,m)}$ into the CPU utilization ratio storage 1206 (step S5). When one server has plural CPUs, an average CPU utilization ratio of the plural CPUs is calculated to obtain the CPU utilization ratio of the server. Incidentally, i in the average CPU utilization ratio $\rho^i_{(n,m)}$ represents the i-th unit time (here, for each one hour). In addition, hereinafter, the word "average" may be omitted.

When the processing result until here is summarized, it is as shown in FIG. 6, for example. In an example of FIG. 6, for each time range, the unit time number i, the request frequency $\lambda^i$(req/sec), the delay actual measurement value $A^i$, the CPU utilization ratio $\rho^i_{(1,1)}$, $\rho^i_{(1,2)}$, $\rho^i_{(2,1)}$ and $\rho^i_{(3,1)}$ are shown.

Next, the CPU time calculator 1208 refers to the request frequency storage 1204, the CPU utilization ratio storage 1206 and the system configuration data storage 1207 to calculate a consumed CPU time per one request, and stores the consumed CPU time into the CPU time storage 1209 (step S7). In order to calculate the delay time, which occurs in each server, first, it is necessary to calculate how long the CPU time per one request is consumed in each server for the request frequency $\lambda^i$ (req/sec) input from the outside to the entire system. However, when the average consumed CPU time per one request is calculated, as a following expression, by simply dividing the product of the CPU utilization ratio $\rho^i_{(n,m)}$ of the server $S_{(n,m)}$ in the unit time i and the number $C_{(n,m)}$ of CPUs by request frequency $\lambda^i$, the following problem occurs.

$$F(C_{(n,m)}, \lambda^i, \rho^i_{(n,m)}) = \frac{C_{(n,m)}\rho^i_{(n,m)}}{\lambda^i} \qquad (12)$$

That is, in the server, generally, a few CPU time other than the processing of the request is consumed by the maintenance and the like of the system. When the request frequency is extremely small, because the ratio of such a CPU time becomes relatively large, the consumed CPU time per one request is estimated to be large and an error may be caused. That is, when, as shown in FIG. 7A, the horizontal axis represents the request frequency, and the vertical axis represents the CPU utilization ratio, and the expression (12) is interpreted as it is, the CPU utilization ratio must be "0" when there is no request. Then, when the inclination of the straight line connecting the origin with each measurement point is handled as the consumed CPU time per one request, the large difference occurs.

In order to solve this problem, it is supposed that the consumed CPU time per one request $1/\mu_{(n,m)}$ is represented as follows:

$$\rho^i_{(n,m)} C_{(n,m)} = \frac{1}{\mu_{(n,m)}} \lambda^i + \alpha_{(n,m)} \qquad (13)$$

Then, the consumed CPU time per one request $1/\mu_{(n,m)}$ is calculated by the regression analysis, and the approximation is carried out by the following expression.

$$F(C_{(n,m)}, \lambda^i, \rho^i_{(n,m)}) \approx \frac{1}{\mu_{(n,m)}}$$

As shown in FIG. 7B, when the regression calculation is carried out, it is possible to calculate the inclination of the regression straight line connecting each measurement point as the consumed CPU time per one request, and obtain an actually closer value.

Incidentally, when the regression calculation is carried out, only data within the business time range designated by the user is used. In a case where all data in the period to be analyzed is used, when the batch processing or the like is carried out during the night in which the number of requests is small, and a phenomenon that a large CPU time is consumed occurs, a phenomenon that the CPU utilization ratio in a case where the number of requests is small is higher than one in a case where the number of requests is large occurs. Then, there is possibility that a large error in the estimation of the consumed CPU time per one request by using the regression calculation is caused. As shown in FIG. 8, when measurement points by the night batch processing are represented by black circles, the black circles are plotted in an upper area of the vertical axis because the CPU utilization ratio becomes high though the request frequency is small. Therefore, when the regression calculation is carried out together with the measurement points (represented by white circles) for a daytime request processing, there is a case where the regression straight line like a solid line is obtained. On the other hand, when only the measurement points for the daytime request processing are used, a proper regression straight line whose inclination is positive like a dotted line is obtained. Therefore, the data should be narrowed to the business time range.

The aforementioned regression calculation is described in detail. When drawing a straight line like an expression (13) for data (CPU utilization ratio $\rho_{(n,m)}$, the number $C_{(n,m)}$ of CPUs, which is the system configuration data, and the request frequency $\lambda^i$) in the business time range designated by the user among data in the period to be analyzed, the inclination $1/\mu_{(n,m)}$ and an intercept $\alpha_{(n,m)}$ are calculated by the least-square method so that the deviation becomes the least, and stored into the CPU time storage 1209. However, when $\alpha_{(n,m)}$ becomes negative, because the possibility that the inclination is excessively estimated is high, the intercept is set to "0", and $1/\mu_{(n,m)}$ is calculated by carrying out the regression analysis as the following straight line again.

$$\rho^i_{(n,m)} C_{(n,m)} = \frac{1}{\mu_{(n,m)}} \lambda^i \qquad (13)$$

In addition, when the inclination $1/\mu_{(n,m)}$ becomes negative, it is judged that the average delay time per one request in the server cannot be analyzed, and a code representing it cannot be analyzed is stored into the CPU time storage 1209. When such a code is stored, the average delay time, which occurs in the layer in which the server is included, cannot be also analyzed.

Returning to the explanation of FIG. 5, next, the server delay time calculator 1210 refers to the CPU utilization ratio storage 1206, the system configuration data storage 1207, the CPU time storage 1209 and the G table storage 1211 to calculate an average delay time per one request, which occurs in each server, and stores the calculated value into the server delay time storage 1214 (step S9). In the i-th unit time, the average delay time $T^i_{(n,m)}$ per one request, which occurs in each server, is given by the following expression.

$$T^i_{(n,m)} = T(C_{(n,m)}, \lambda^i, \rho^i_{(n,m)}) \approx \frac{1}{\mu_{(n,m)}} G(C_{(n,m)}, \rho^i_{(n,m)}) \qquad (14)$$

However, when $\rho=0$, $G(C, 0)=1$.

Here, although $1/\mu_{(n,m)}$ represents the consumed CPU time per one request, this is equal to the average delay time, which occurs when the load is 0%. Then, when the load is $\rho$, it means that the delay becomes $G(C, \rho)$ times of a case when the load is 0%.

$G(C, \rho)$ is calculated by the number of CPUs and the CPU utilization ratio of the server, as shown in the expression (3). However, because it takes relatively long time to calculate the expression (3) as it is, when the grain size of the analysis has been determined, it is possible to calculate $G(C, \rho)$ in advance by changing the number of CPUs and the CPU utilization ratio of the server. For example, when the grain size of the analysis is enough in 1% unit for the CPU utilization ratio and the assumed number of CPUs per one server is equal to or less than 50, $G(C, \rho)$ is calculated in advance in respective cases of the CPU utilization ratio from 0 to 99% (1% interval) and the number of CPUs in the server from 1 to 50, and they are stored in the G table storage 1211 as a matrix 100×50. Then, when obtaining the number of CPUs from the system configuration data storage 1207, and obtaining the CPU utilization ratio from the CPU utilization ratio storage 1206, a value of $G(C, \rho)$ can be obtained from the G table storage 1211.

Finally, the average delay time $T^i_{(n,m)}$ per one request, which occurs in each server, (hereinafter, also called as the average delay time of each server, simply) is calculated according to the expression (14), and stored into the server delay time storage 1214.

Next, the layer delay time calculator 1215 refers to the server delay time storage 1214 and the system configuration data storage 1207 to calculate the delay time $L^i_n$ in each layer, and stores the delay time into the layer delay time storage 1216 (step S11). The delay time $L^i_n$ in each layer is the sum of the average delay times of the servers for each layer. $M_n$ is obtained from the system configuration data storage 1207.

$$L^i_n = \sum_{m=1}^{M_n} T^i_{(n,m)}$$

Then, the system delay time calculator 1217 refers to the layer delay time storage 1216 and the system configuration data storage 1207 to calculate the delay time $D^i$ of the entire system, and stores the delay time into the system delay time storage 1218 (step S13). The delay time $D^i$ of the entire system is the sum of the delay times $L^i_n$ in each layer n, and is represented as follows:

N is obtained from the system configuration data storage 1207.

$$D^i = \sum_{n=1}^{N} L^i_n$$

After that, the remaining delay time calculator 1219 refers to the delay actual measurement value storage 1205 and the system delay time storage 1218 to calculate the delay time $E^i$ consumed in the portion other than the server, and stores the delay time into the remaining delay time storage 1220 (step S15). The delay time $E^i$ is a difference between the delay time $D^i$ of the entire system and the delay actual measurement value $A^i$, and is calculated as follows:

$$E^i = \begin{cases} A^i - D^i & (A^i \geq D^i) \\ 0 & (A^i < D^i) \end{cases}$$

$A^i < D^i$ means that the aforementioned estimation result is not proper, and in such a case, $E^i = 0$ is set.

Then, in order to correct the delay time mainly in a case of $E^i = 0$, the confidence degree calculator 1221 refers to the remaining delay time storage 1220, the layer delay time storage 1216, the system configuration data storage 1207, the request frequency storage 1204, the CPU utilization ratio storage 1206 and the delay actual measurement value storage 1205 to carry out a calculation processing of the confidence degree of the average delay time for each layer, and stores the processing result into the confidence degree storage 1222 (step S17). This processing is explained by using FIG. 9. First, the confidence degree calculator 1221 calculates a correlation coefficient between the total sum ρ of the consumed CPU times of the n-th layer and the request frequency λ as an initial confidence degree $R^i_n$ of the average delay time of each layer n, and stores the correlation coefficient into the confidence degree storage 1222 (step S31). When a function to calculate the correlation coefficient is represented by "correl", the confidence degree $R^i_n$ is calculated according to the following expression.

$$R^i_n = correl\left(\sum_{m=1}^{M_n} C_{(n,m)} \rho_{(n,m)}, \lambda\right) \quad (15)$$

The first item of the correl function in the expression (15) is the total sum of the consumed CPU time in the n-th layer. Incidentally, because the correlation coefficient is also used for the later calculation, that is held for each layer.

Then, the confidence degree calculator 1221 judges whether or not the correlation coefficient $R^i_n$ is negative (step S33). In a case of the correlation coefficient <0, the confidence degree calculator 1221 sets the confidence degree $R^i_n = 0$ (step S37). This is because it is assumed that the positive correlation exists between the consumed CPU time and the request frequency, and there is no meaning for the negative correlation. On the other hand, in a case of the correlation coefficient ≥0, the confidence degree calculator 1221 judges whether or not the estimated delay time $D^i$ of the entire system is longer than the average delay actual measurement value $A^i$ (step S35). When $D^i > A^i$ is satisfied, the processing shifts to step S37 because impossible estimation is made and the calculated delay time itself has the low confidence. That is, the confidence degree calculator 1221 sets the confidence degree $R^i_n = 0$. On the other hand, in a case of $D^i \leq A^i$, the correlation coefficient calculated at the step S31 is used as the confidence degree as it is.

Returning to the explanation of FIG. 5, the delay time corrector 1223 refers to the confidence degree storage 1222 and the layer delay time storage 1216 to correct the delay time according to the confidence degree, and stores the corrected delay time into the corrected delay time storage 1224 (step S19). Incidentally, in a case of $A^i \geq D^i$, this step is skipped. This processing will be explained by using FIG. 10. First, the delay time corrector 1223 refers to the layer delay time storage 1215 and the confidence degree storage 1222 to sort the delay time of each layer in descending order of the confidence degree, and stores the sorting result into the correct delay time storage 1224 (step S41). Incidentally, when plural layers whose confidence degree is "0" exist, the delay time is sorted in descending order of those correlation coefficients.

Then, the delay time corrector 1223 adds the delay time of the layer in descending order of the confidence degree according to the sorting result, and identifies an order B of the confidence degree at which the added value becomes the maximum value less than the average delay actual measurement value (step S43). Here, it is assumed that $P_x = n$ represents the order of the confidence degree $R^i_n$ of the n-th layer is the x-th from the top. Then, $R^i_{P_x} > R^i_{P_{x+1}}$ is always satisfied. Then, at the step S43, the maximum y satisfying the following expression is calculated. This is B.

$$A^i > \sum_{x=1}^{y} L^i_{P_x}$$

It is unnecessary to correct the delay time of the layer whose confidence degree is one of 1st to B-th, which was calculated as described above. Therefore, the delay time corrector 1223 corrects the delay time of the layer whose confidence degree is the (B+1)-th as follows: (step S45). That is, the estimated delay time $L^i_{P_{x+1}}$ of the $(P_{B+1})$-th layer is corrected, and the result is $L'^i_{P_{x+1}}$. The correction result and the delay times of the layers, which is unnecessary to correct (layers whose confidence degree is one of 1st to B-th), are stored into the corrected delay time storage 1224.

$$L'^i_{P_{B+1}} = A^i - \sum_{x=1}^{B} L^i_{P_x}$$

This expression represents that the delay time of the layer whose confidence degree is the (B+1)-th so that the delay actual measurement value is equal to the total sum of the delay times (estimated average value) from the top of the confidence degree to the (B+1)-th among the confidence degree of each layer.

In addition, the delay time corrector 1223 corrects the confidence degree of the layer whose confidence degree is the (B+1)-th as follows (step S47). That is, the delay time corrector 1223 corrects the confidence degree $R^i_{P_{x+1}}$ of the $(P_{B+1})$-th layer, and uses the result as $R'^i_{P_{x+1}}$. The correction result and the confidence degree data of the layers, which are unnecessary to correct, (layers whose confidence degree is one of 1st to B-th) is stored into the corrected delay time storage 1224.

$$R'^i_{B+1} = \frac{L'^i_{P_{B+1}}}{L^i_{P_{B+1}}}$$

This expression represents that the confidence degree is corrected so that the smaller the difference between the delay time before the correction and the delay time after the correction is, the higher the confidence degree becomes.

Furthermore, the delay time corrector 1223 corrects the delay time and the confidence degree of the layer whose confidence degree is the (B+2)-th or the subsequent as follows (step S49). The correction result is stored into the corrected delay time storage 1224.

$$L'^i_{P_n} = 0 \quad (n > B+1)$$

$$R'^i_{P_n} = 0 \quad (n > B+1)$$

A specific example of this correction processing will be explained by using FIGS. 11A to 11C. First, FIG. 11A indicates the delay time estimation result and the actual measurement result. The first layer of the monitor target system 100 in this example is a Web server, and the second layer is an application server, and the third layer is a DB server. Here, the estimated delay time of the first layer is 150 m seconds, the correlation coefficient is 0.9, and the confidence degree is 0. The estimated delay time of the second layer is 60 m seconds, the correlation coefficient is 0.85, and the confidence degree is 0.85. The estimated delay time of the second layer is 30 m seconds, the correlation coefficient is 0.6, and the confidence degree is 0.6. Incidentally, the average delay actual measurement value is 100 m seconds.

Then, when the sorting is carried out at the step 541, as shown in FIG. 11B, the layers are arranged in order of the second layer, the third layer and the first layer, the delay time of the entire system apparently exceeds the average delay actual measurement value, and the estimated delay time of the entire system exceeds on the way of the first layer.

Therefore, as shown in FIG. 11C, as for the second and third layers, the delay times and the confidence degrees are used as they are, and the estimated delay time of the first layer is decreased to the difference between the average delay actual measurement value and the sum of the delay times of the second and third layers, and 10 m seconds is obtained. Moreover, the confidence degree is also corrected to 0.06 (=10/150).

By carrying out such a processing, the correction so as to fit the estimated value to the actual measurement value is carried out.

Returning to the explanation of FIG. 5, the input/output unit 121 carries out an output processing (step S21). Data the input/output unit 121 outputs includes (1) the estimated value $T^i_{(n,m)}$ of the delay time, which occurs in each server, (2) the estimated value $L^i_n$ of the delay time, which occurs in each layer, (3) the estimated value $D^i_n$ of the delay time, which occurs in the entire system, (4) the delay time $E^i$ of the portion other than the servers, (5) the confidence degree of the delay time of each layer and the like. In a case of the confidence degree, the value itself may be output, and the confidence degree $R^i_n$ may be categorized into three levels described below, for example, and the categorization result may be output. That is, if $R^i_n > 0.7$, the confidence degree is "high", if $0.7 \geq R^i_n > 0.3$, the confidence degree is "middle", and if $0.3 \geq R^i_n$, the confidence degree is "low".

The categorization of the confidence degree such as "high", "middle" and "low", which is described above, is based on values generally used for the judgment of the correlation strength in the correlation coefficient. That is, generally, when the absolute value of the correlation coefficient is equal to or greater than 0.7, it is judged that there is strong correlation between two parameters, when it is within a range from 0.3 to 0.7, it is judged that there is weak correlation, and when it is equal to or less than 0.3, it is judged that there is almost no correlation. This is because the square of the correlation coefficient is an explanatory rate of the variance. Then, when the correlation coefficient is 0.7, the explanatory rate is 0.49 (about 50%). That is, about a half of the variance of the dependent variable can be explained by the explanatory variable. In addition, when the correlation coefficient is 0.3, the explanatory rate is 0.1 (about 10%), and because the variance caused by the explanatory variable among the variance of the dependent variable is only about 10%, it is judged that there is almost no correlation between the explanatory variable and the dependent variable.

Similarly considering in this embodiment, when the correlation coefficient is equal to or greater than 0.7, there is enough correlation between the CPU utilization ratio and the request frequency, and because the consumed CPU time per one request can be appropriately estimated, it is considered that the confidence degree becomes high. In addition, when the guidance of the relation between this confidence degree and the prediction error is obtained from the experimental result in the experiment environment, the possibility is high in which the prediction error is about within ±50% in a case of the confidence degree "high", the prediction error is about within ±100% in a case of the confidence degree "middle", and the prediction error is greater than ±100% in a case of the confidence degree "low". However, this result is mere guidance based on the experimental result after all, and the aforementioned accuracy (error range) is not secured.

By carrying out such a processing as described above, it becomes possible to calculate the delay times of each server, each layer and the entire system by using the elements, which already exist in the monitor target system 100. In addition, it is possible to correct the delay time from the relation with the delay actual measurement value, and further present the confidence degree for the user.

Next, the performance prediction using the aforementioned model will be explained.

Figure 12:
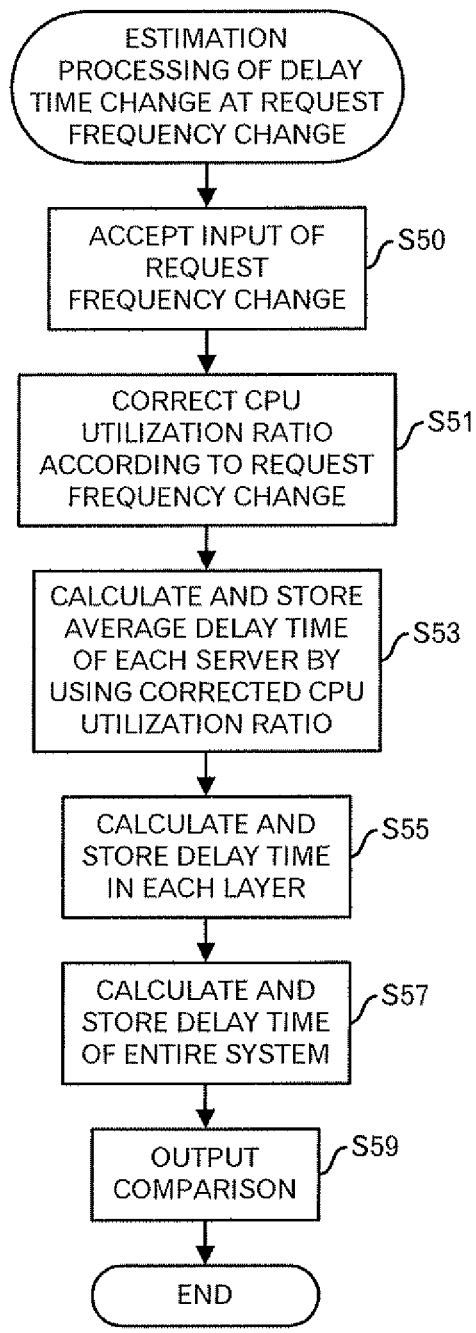
FIG. 12 is a diagram showing a processing flow of an estimation processing of the delay time change at the request frequency change.

First, the estimation of the delay time change at the request frequency change will be explained by using FIG. 12. Here, it is assumed that at a certain time i, the request frequency is $\lambda$, and the estimated average delay time will be calculated when the request frequency changes from $\lambda$ to $\lambda'$. Namely, $\lambda'$ is input from the input/output unit 121, and the performance prediction processor 1213 of the delay analysis apparatus 120 accepts the input (step S50). Then, the performance prediction processor 1213 changes the CPU utilization ratio $\rho$ for all the servers $S_{(n,m)}$ according to the request frequency change, and stores the changed CPU utilization ratio into the CPU utilization ratio storage 1206 (step S51). The CPU utilization ratio $\rho$ is changed to $\rho'$ described below. In addition, the server delay time calculator 1210 calculates the delay time $T'^i_{(n,m)}$ of each server after the change by using the CPU utilization ratio $\rho'$ after the change, and stores the calculated delay time into the server delay time storage 1214 (step S53). The calculations at the steps S51 and S53 are as follows:

$$\rho'^i_{(n,m)} = \rho^i_{(n,m)} + \frac{\lambda' - \lambda}{\mu_{(n,m)} C_{(n,m)}}$$

$$T'^i_{(n,m)} = \frac{1}{\mu_{(n,m)}} G(C_{(n,m)}, \rho'^i_{(n,m)})$$

Then, the layer delay time calculator 1215 calculates the delay time in each layer after the change by using the delay time $T'^i_{(n,m)}$ of each server after the change, which is stored in the server delay time storage 1214, and stores the calculated delay time into the layer delay time storage 1216 (step S55). Furthermore, the system delay time calculator 1217 calculates the delay time of the entire system after the change by using the delay time in each layer after the change, which is stored in the layer delay time storage 1216, and stores the calculated delay time into the system delay time storage 1218 (step S57).

After that, the input/output unit 121 outputs each delay time and the like before and after the change (step 559). Thus, the user can investigate the change of the delay time according the change of the request frequency.

Figure 13:
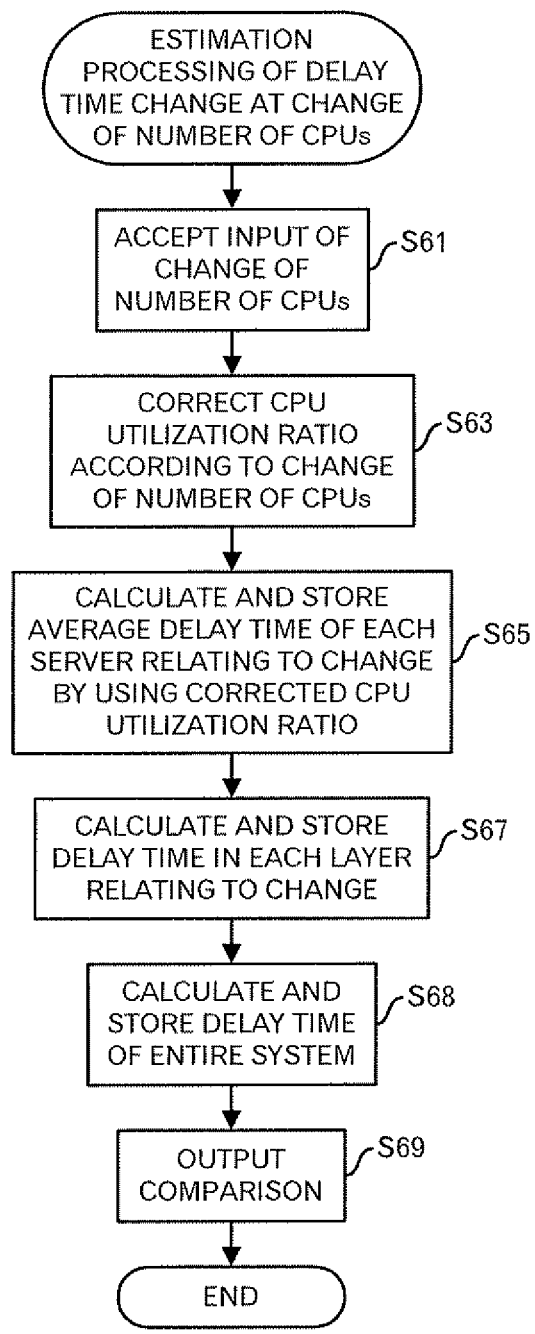
FIG. 13 is a diagram showing a processing of an estimation processing of the delay time change at change of the number of CPUs.

Next, the performance prediction at the change of the number of CPUs will be explained by using FIG. 13. Here, the number of CPUs of the server $S_{(n,m)}$ is changed from $C_{(n,m)}$ to $C'_{(n,m)}$. Therefore, the number $C'_{(n,m)}$ of CPUs is input from the input/output unit 121, and the performance prediction processor 1213 of the delay analysis apparatus 120 accepts the input (step S61). Then, the performance prediction processor 1213 changes the CPU utilization ratio ρ according to the change of the number of CPUs, and stores the changed CPU utilization ratio into the CPU utilization ratio storage 1206 (step S63). The CPU utilization ratio ρ is changed only for the server in which the number of CPUs is changed, as follows. In addition, the server delay time calculator 1210 calculates the delay time $T'^i_{(n,m)}$ of each server in which the number of CPUs is changed by using the CPU utilization ratio ρ' after the change, and stores the delay time into the server delay time storage 1214 (step S65). The calculations at the steps S63 and S65 are as follows:

$$\rho'^i_{(n,m)} = \frac{C_{(n,m)}}{C'_{(n,m)}} \rho^i_{(n,m)}$$

$$T'^i_{(n,m)} = \frac{1}{\mu_{(n,m)}} G(C'_{(n,m)}, \rho'^i_{(n,m)})$$

Then, the layer delay time calculator 1215 calculates the delay time in the layer relating to the change by using the delay time $T'^i_{(n,m)}$ of the server after the changer which is stored in the server delay time storage 1214, and stores the calculated delay time into the layer delay time storage 1216 (step S67). Furthermore, the system delay time calculator 1217 calculates the delay time of the entire system after the change by using the delay time in each layer, which is stored in the layer delay time storage 1216, and stores the calculated delay time into the system delay time storage 1218 (step S68).

After that, the input/output unit 121 outputs each delay time before and after the change (step S69). Thus, the user can consider the change of the delay time according to the change of the number of CPUs. For example, by using this result, he or she investigates the effect in a case where the number of CPUs is increased.

Figure 14:
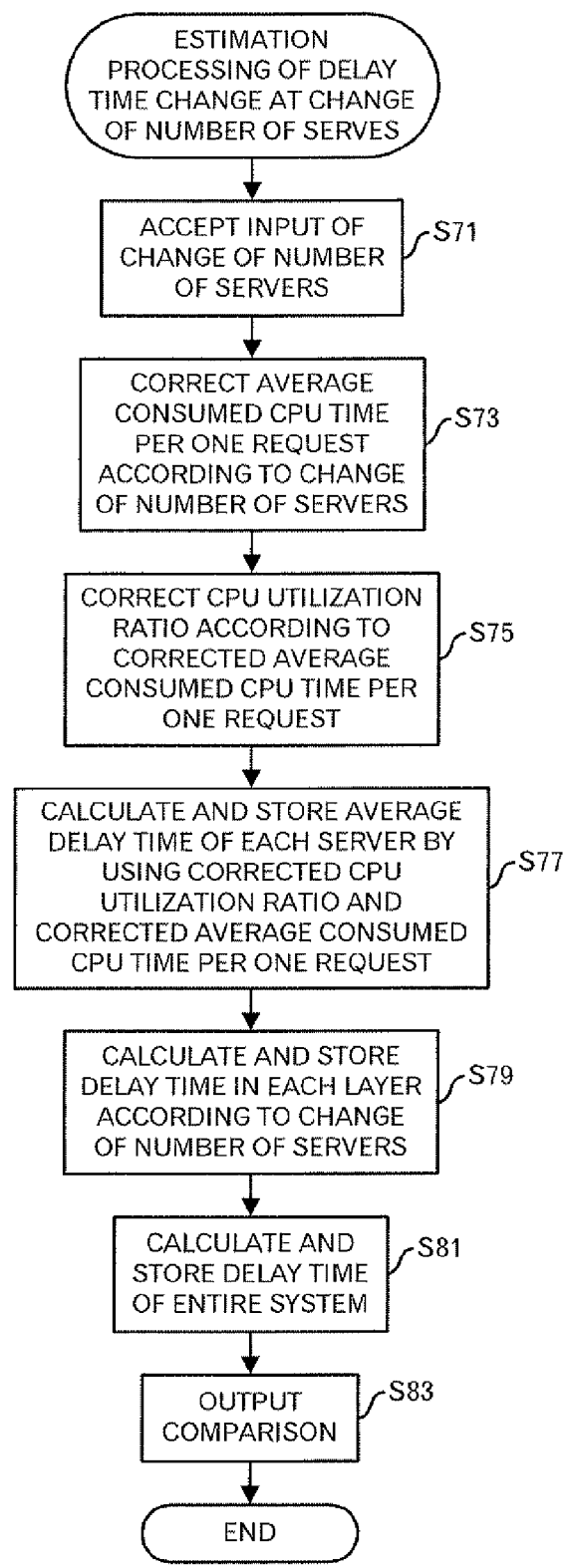
FIG. 14 is a diagram showing a processing flow of an estimation processing of the delay time change at change of the number of servers.

Next, the performance prediction at the number of servers will be explained by using FIG. 14. Here, it is assumed that the estimated delay time when the number of servers in the n-th layer is changed from $M_n$ to $M'_n$ is calculated. Therefore, the number $M'_n$ of servers in the n-th layer is input from the input/output unit 121, and the performance prediction processor 1213 of the delay analysis apparatus 120 accepts the input (step S71). Then, the performance prediction processor 1213 corrects the consumed CPU time per one request according to the change of the number of servers, and stores the corrected consumed CPU time into the CPU time storage 1209 (step S73) The consumed CPU time $1/\mu_{(n,m)}$ per one request is changed to $1/\mu'_{(n,m)}$ as follows. In addition, the performance prediction processor 1213 corrects the CPU utilization ratio ρ according to the correction of the consumed CPU time per one request, and stores the corrected CPU utilization ratio into the CPU utilization ratio storage 1206 (step S75). The CPU utilization ratio ρ is changed to ρ' as follows:

$$\frac{1}{\mu'_{(n,m)}} = \frac{M_n}{M'_n} \frac{1}{\mu_{(n,m)}} \quad (16)$$

$$\rho'^i_{(n,m)} = \frac{1}{C_{(n,m)}} \left( \frac{1}{\mu'_{(n,m)}} \lambda^i + \alpha_{(n,m)} \right)$$

Incidentally, $\alpha_{(n,m)}$ is an intercept obtained when $1/\mu_{(n,m)}$ is calculated, and is stored in the CPU time storage 1209. Therefore, this value is used.

Next, the server delay time calculator 1210 calculates the server delay time after the change by using the CPU utilization ratio ρ' after the change, which is stored in the CPU utilization ratio storage 1206, and the consumed CPU time $1/\mu'_{(n,m)}$ per one request after the change, which is stored in the CPU time storage 1209, and stores the calculated server delay time into the server delay time storage 1214 (step S77). The server delay time $T'^i_{(n,m)}$ after the change is represented as follows:

$$T'^i_{(n,m)} = \frac{1}{\mu'_{(n,m)}} F(C_{(n,m)}, \rho'^i_{(n,m)})$$

Then, the layer delay time calculator 1215 calculates the delay time in each layer by using the server delay time $T'^i_{(n,m)}$ after the change, which is stored in the server delay time storage 1214, and stores the calculated delay time into the layer delay time storage 1216 (step S79). Incidentally, also at this step, $M'_n$ from the performance prediction processor 1213 is used for the following calculation.

$$L'^i_n = \frac{M'_n}{M_n} \sum_{m=1}^{M_n} T'^i_{(n,m)}$$

Incidentally, $L'^i_n$ is represented from the expression (16) as follows:

$$L'^i_n = \frac{M'_n}{M_n} \sum_{m=1}^{M_n} T'^i_{(n,m)}$$

$$= \frac{M'_n}{M_n} \sum_{m=1}^{M_n} \frac{M_n}{M'_n} \frac{1}{\mu_{(n,m)}} G(C_{(n,m)}, \rho'^i_{(n,m)})$$

$$= \sum_{m=1}^{M_n} \frac{1}{\mu_{(n,m)}} G(C_{(n,m)}, \rho'^i_{(n,m)})$$

Furthermore, the system delay time calculator 1217 calculates the delay time of the entire system after the change by using the delay time in each layer, which is stored in the layer delay time storage 1216, and stores the calculated delay time into the system delay time storage 1218 (step S81).

After that, the input/output unit 121 outputs each delay time before and after the change (step S83). Thus, the user can consider the change of the delay time according to the change of the number of servers. For example, by using this result, he or she investigates the effect when the number of servers is increased.

Figure 16:
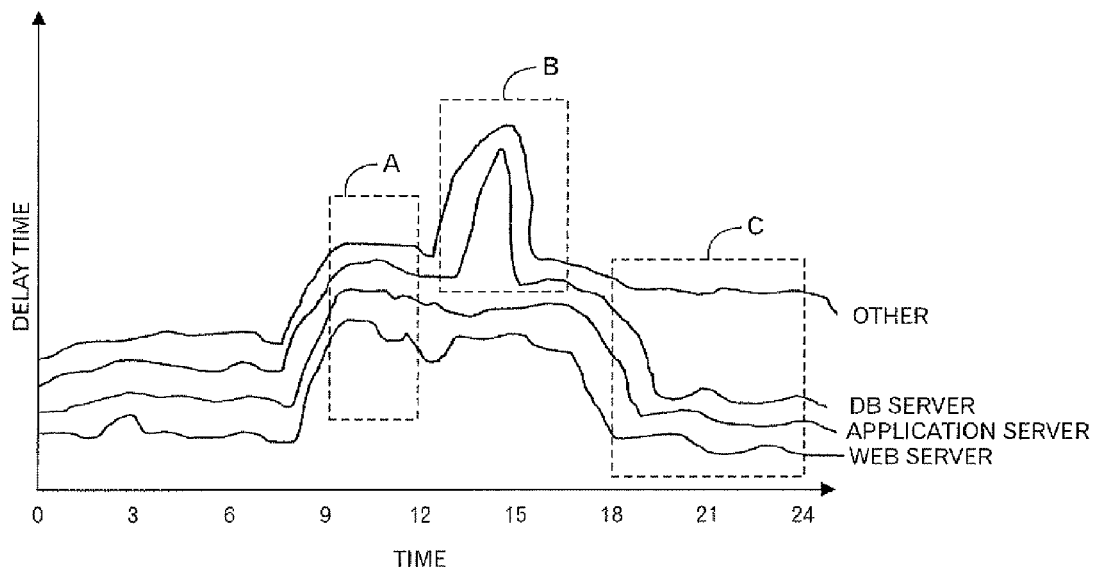
FIG. 16 is a diagram showing an example of a processing result graphing.

Although the embodiment of this invention is described above, this invention is not limited to this. For example, the functional block diagrams shown in FIGS. 4A and 4B are mere examples, and the actual program configuration does not always correspond. As for the output processing, not only the values are displayed as they are, but also the table as shown in FIG. 15 (table to display, for each unit time i, the consumed CPU time per one request, the CPU utilization ratio, the average delay time for each server, the average delay time for each layer, the delay actual measurement value, the estimated delay time other than the server and the confidence degree of the delay time for each layer) and the graph as shown in FIG. 16 (graph in which the horizontal axis represents time, and the vertical axis represents the delay time, and which represents the time change of the delay times of the Web server (the first layer), the application server (the second layer), the DB server (the third layer) and other) may be generated and displayed. Incidentally, when watching the graph of FIG. 16, it becomes possible to judge that during the normal time from 9 to 12 o'clock, the delay of the Web server almost occupies the half and more (portion A of FIG. 16), from 12 to 15 o'clock, because of the temporal load increase of the DB server, the response is extremely lowered (portion B of FIG. 16), since 18 o'clock, the delay time other than the server increases and any problem may occur (portion C of FIG. 16).

Figure 17:
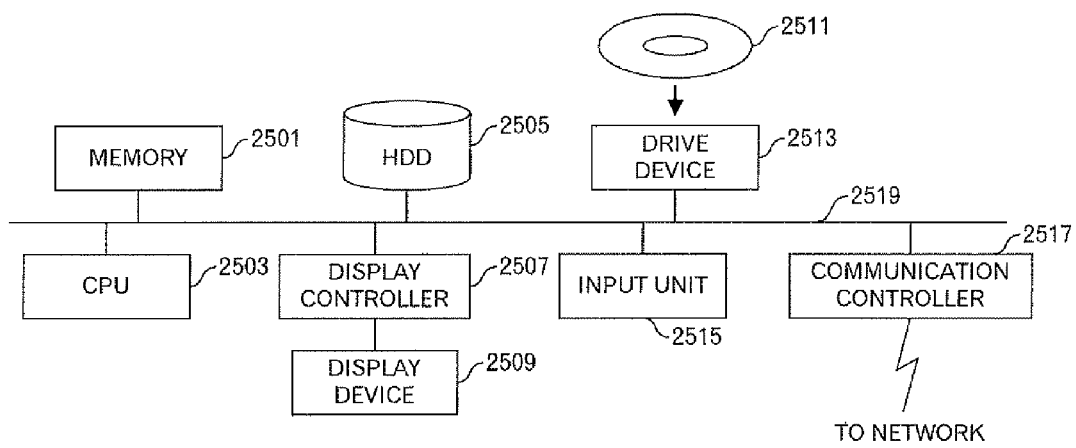
FIG. 17 is a functional block diagram of a computer.

Incidentally, the aforementioned delay analysis apparatus 120 is a computer device as shown in FIG. 17. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

What is claimed is:

1. An analysis apparatus for carrying out an analysis for responses of a computer system including a plurality of servers, comprising:
    a unit to obtain data concerning a CPU utilization ratio of each of said plurality of servers from said computer system;
    a storage device;
    a unit to obtain processing history data generated in said computer system, to generate data of a request frequency by users of said computer system, and to store said data of said request frequency into said storage device; and
    an estimate unit to estimate an average delay time in each said server by using said CPU utilization ratio of each said server and said request frequency stored in said storage device, and
    wherein said estimate unit comprises:
    a consumed CPU time estimate unit to estimate an average consumed CPU time per one request for each said server by carrying out a regression analysis using said CPU utilization ratio of each said server and said request frequency; and
    a server delay time estimate unit to estimate an average delay time in each said server by using said average consumed CPU time per one request for each said server and said CPU utilization ratio of each said server, and
    said consumed CPU time estimate unit calculates inclination of a regression straight line on a plane mapped by said CPU utilization ratio and said request frequency as said average consumed CPU time per one request for each said server.

2. The analysis apparatus as set forth in claim 1, wherein said consumed CPU time estimate unit carries out the regression analysis using said CPU utilization ratio of each said server and said request frequency, which were obtained during a period when said request frequency was greater than a threshold.

3. The analysis apparatus as set forth in claim 1, wherein said server delay time estimate unit reads out a pertinent coefficient value representing a relation between said average consumed CPU time per one request for said server and said average delay time in said server by referring to a matrix storage storing said coefficient values for each predetermined unit of said CPU utilization ratio, which is an element to determine said coefficient value, and for each number of CPUs, and calculates said average delay time in said server from the read coefficient value and said average consumed CPU time per one request for said server.

4. The analysis apparatus as set forth in claim 1, further comprising:
    a unit to estimate, when said plurality of servers included in said computer system are categorized according to job types to be executed, said average delay time for each said category.

5. The analysis apparatus as set forth in claim 4, further comprising:
    a unit to estimate an average delay time for the entire computer system by using said average delay time in each said server.

6. The analysis apparatus as set forth in claim 5, further comprising:
    a unit to obtain an average actual measurement value of a response time for a request by a user; and
    a unit to estimate a delay time, which occurs in a portion other than said servers, by a difference between said average actual measurement value and said average delay time of said entire computer system.

7. The analysis apparatus as set forth in claim 6, further comprising:
    a unit to calculate, for each said category, a correlation coefficient between a total sum of said average consumed CPU times and said request frequency, and to determine a confidence degree of said average delay time for each said category based on said correlation coefficient; and
    a correction unit to correct said average delay time for each said category based on said confidence degree of said average delay time for each said category.

8. The analysis apparatus as set forth in claim 7, wherein said correction unit comprises:
    a unit to sort said average delay times in descending order of said confidence degree;
    a unit to accumulate said average delay times for each said category in said descending order of said confidence degree, and to identify an order of said confidence degree at which the accumulated average delay time becomes a maximum value less than said delay actual measurement value; and a unit to correct a delay time in a next order of the identified order of said confidence degree to a difference between said delay actual measurement value and a value obtained by accumulating said average delay times for each said category in said descending order of said confidence degree up to said identified order of said confidence degree.

9. The analysis apparatus as set forth in claim 1, further comprising:

a unit to change, when said request frequency is changed, said CPU utilization ratio of each said server according to the changed request frequency;

a unit to estimate an average delay time for each said server by using the changed CPU utilization ratio for each said server; and a unit to output said average delay times for each said server after and before the change in a comparable manner.

10. The analysis apparatus as set forth in claim 1, further comprising:

a unit to change, when a number of CPUs is changed, said CPU utilization ratio of each said server according to the changed number of CPUs;

a unit to estimate an average delay time in each said server by using the changed CPU utilization ratio of each said server and the changed number of CPUs; and a unit to output said average delay times of each said server before and after the change, in a comparable manner.

11. The analysis apparatus as set forth in claim 1, further comprising:

a unit to calculate, when a number of servers is changed, calculating an average consumed CPU time per one request for each said server according to the changed number of servers;

a unit to calculate a CPU utilization ratio for each said server after the change by using a number of CPUs and said average consumed CPU time per one request for each said server after the change; and a unit to estimate an average delay time for each said server after the change by using said average consumed CPU time per one request for each said server after the change and said CPU utilization ratio for each said server after the change.

12. The analysis apparatus as set forth in claim 11, further comprising:

a unit to estimate an average delay time for each category defined by classifying said plurality of servers in said computer system according to a job type to be executed by using said average delay time for each said server after the change and the changed number of servers.

13. A non-transitory computer-readable storage medium storing a program for causing a computer to execute a process of an analysis for responses of a computer system including a plurality of servers, said process comprising:

obtaining data concerning a CPU utilization ratio of each of said plurality of servers from said computer system;

obtaining processing history data generated in said computer system, and generating data of a request frequency by users of said computer system; and first estimating an average delay time in each said server by using said CPU utilization ratio of each said server and said request frequency, and wherein said first estimating comprises:

second estimating an average consumed CPU time per one request for each said server by carrying out a regression analysis using said CPU utilization ratio of each said server and said request frequency; and third estimating an average delay time in each said server by using said average consumed CPU time per one request for each said server and said CPU utilization ratio of each said server, and said second estimating comprises calculating inclination of a regression straight line on a plane mapped by said CPU utilization ratio and said request frequency as said average consumed CPU time per one request for each said server.

14. An analysis method for carrying out an analysis for responses of a computer system including a plurality of servers, said method comprising:

obtaining, by a computer, data concerning a CPU utilization ratio of each of said plurality of servers from said computer system;

obtaining, by said computer, processing history data generated in said computer system, generating data of a request frequency by users of said computer system, and storing said data of said request frequency into said storage device; and first estimating, by said computer, an average delay time in each said server by using said CPU utilization ratio of each said server and said request frequency stored in said storage device, wherein said first estimating comprises:

second estimating an average consumed CPU time per one request for each said server by carrying out a regression analysis using said CPU utilization ratio of each said server and said request frequency; and third estimating an average delay time in each said server by using said average consumed CPU time per one request for each said server and said CPU utilization ratio of each said server, and said second estimating comprises calculating inclination of a regression straight line on a plane mapped by said CPU utilization ratio and said request frequency as said average consumed CPU time per one request for each said server.

* * * * *